US007348707B2

(12) United States Patent
Laskaris et al.

(10) Patent No.: US 7,348,707 B2
(45) Date of Patent: Mar. 25, 2008

(54) ELECTROMECHANICAL DEVICE HAVING THREE-DIMENSIONAL STATOR LAMINATIONS

(75) Inventors: Evangelos Laskaris, Schenectady, NY (US); James Alexander, Ballston Lake, NY (US); Kiruba Sivasubramaniam, Troy, NY (US); Manoj Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 344 days.

(21) Appl. No.: 11/291,944

(22) Filed: Nov. 30, 2005

(65) Prior Publication Data

US 2007/0120435 A1 May 31, 2007

(51) Int. Cl.
*H02K 1/12* (2006.01)
*H02K 1/18* (2006.01)
*H02K 19/06* (2006.01)
*H02K 55/06* (2006.01)

(52) U.S. Cl. .................. 310/216; 310/217; 310/218
(58) Field of Classification Search ........ 310/216–218, 310/254, 166, 168, 178, 112, 114
See application file for complete search history.

(56) References Cited

U.S. PATENT DOCUMENTS 3,017,562 A  1/1962 Duane .................. 332/46
3,534,205 A * 10/1970 D'Ornano .................. 310/178
3,535,572 A * 10/1970 De Rugeris ................. 310/168
3,743,873 A *  7/1973 de Jong .................... 310/165
4,032,807 A *  6/1977 Richter ..................... 310/178
4,088,911 A   5/1978 Wetzig ...................... 310/178
5,504,382 A *  4/1996 Douglass et al. ...... 310/156.25
5,514,924 A *  5/1996 McMullen et al. ........ 310/90.5
6,865,797 B2*  3/2005 Walko et al. ................ 29/596
6,943,473 B2*  9/2005 Furuse et al. .............. 310/112
2004/0239201 A1  12/2004 Sivasubramaniam et al. .... 310/178

FOREIGN PATENT DOCUMENTS

CA    2467177AA   11/2004
EP    1482628 A2  12/2004

* cited by examiner

*Primary Examiner*—Tran Nguyen
(74) *Attorney, Agent, or Firm*—Fletcher Yoder (57) ABSTRACT

In certain embodiments, an electromechanical device includes a rotor having a rotational axis, and a stator disposed about the rotor. The stator may include a circumferentially laminated section comprising a plurality of circumferential segments disposed one after another in a circumferential direction relative to the rotational axis. The stator also may include a radially laminated section comprising a plurality of radial segments disposed one after another in a radial direction relative to the rotational axis. In addition, the stator may include an axially laminated section comprising a plurality of axial segments disposed one after another in an axial direction relative to the rotational axis.

22 Claims, 6 Drawing Sheets

ELECTROMECHANICAL DEVICE HAVING THREE-DIMENSIONAL STATOR LAMINATIONS

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A variety of systems include electromechanical devices, such as a generator or an electric motor, which include a rotor and a stator. In certain applications, the construction and configuration of the rotor and stator can significantly affect the flux carrying capability, the core losses, the power density, the mechanical integrity, and the thermal performance of the electromechanical device. For example, these issues are particularly relevant to the construction and configuration of a homopolar inductor alternator (HIA) having a stationary high temperature superconductor (HTS) coil and a high-power-density stator. Due to high frequency power electronically fed loads, the core losses in the stator can be significant due to flux broad-siding the segments if segments of the stator are not configured in an optimal manner. The stator core also acts as a torque transmitter and, therefore, is preferably a mechanically sound structure.

Accordingly, a technique is needed to carry flux in an optimal manner to minimize current losses and weight, while keeping construction and assembly simple.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention.) Indeed, the invention may encompass a variety of aspects that may not be set forth below.

In certain embodiments, an electromechanical device includes a rotor having a rotational axis, and a stator disposed about the rotor. The stator may include a circumferentially laminated section comprising a plurality of circumferential segments disposed one after another in a circumferential direction relative to the rotational axis. The stator also may include a radially laminated section comprising a plurality of radial segments disposed one after another in a radial direction relative to the rotational axis. In addition, the stator may include an axially laminated section comprising a plurality of axial segments disposed one after another in an axial direction relative to the rotational axis.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
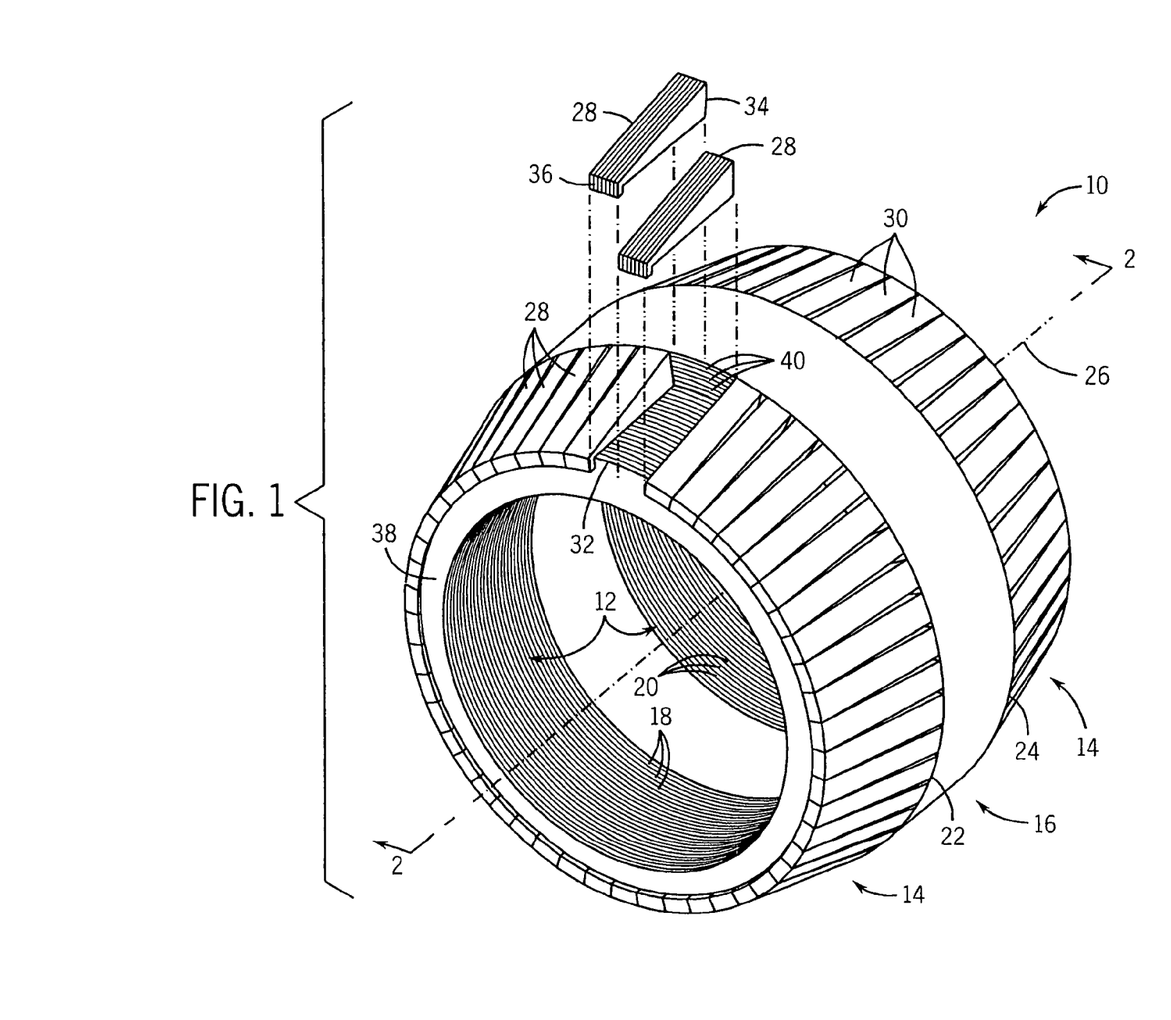
FIG. 1 is a perspective view of an exemplary three-dimensionally laminated stator having an axially laminated section, a circumferentially laminated section, and a radially laminated section in accordance with embodiments of the present technique.

FIG. 1 is a perspective view of an exemplary three-dimensionally laminated stator 10 in accordance with certain embodiments of the present technique. As illustrated, the three-dimensionally laminated stator 10 includes one or more axially laminated sections 12, one or more circumferentially laminated sections 14, and one or more radially laminated sections 16. In the illustrated embodiment, the one or more axially laminated sections 12 include a first plurality of axially laminated segments 18 and a second plurality of axially laminated segments 20, wherein the first and second plurality of axially laminated segments 18 and 20 are axially offset from one another and disposed on opposite sides 22 and 24 of the radially laminated section 16. For example, the first and second plurality of axially laminated segments 18 and 20 may include a plurality of ring-shaped or washer-shaped structures laminated together one after another in an axial direction along a central longitudinal axis 26 of the three-dimensionally laminated stator 10. Also, this can be a number of less than 360° segments that constitute the rings.

The one or more circumferentially laminated sections 14 may include a first plurality of circumferentially laminated segments 28 and a second plurality of circumferentially laminated segments 30, wherein the first and second plurality of circumferentially laminated segments 28 and 30 are axially offset from one another and disposed on the opposite sides 22 and 24 of the radially laminated section 16. In addition, the first plurality of circumferentially laminated segments 28 may be concentric with the first plurality of axially laminated segments 18, while the second plurality of circumferentially laminated segments 30 may be concentric with the second plurality of axially laminated segments 20. For example, the illustrated first and second plurality of circumferentially laminated segments 28 and 30 are disposed along and around an outer circumference or surface 32 of the first and second plurality of axially laminated segments 18 and 20, respectively. In this manner, the first and second pluralities of circumferentially laminated segments 28 and 30 have a ray-like or rays of the sun type of configuration on the opposite sides 22 and 24 of the radially laminated section 16.

As illustrated in FIG. 1, the circumferentially laminated segments 28 are arranged one after another in a circumferential direction around the circumference of the three-dimensionally laminated stator 10. In addition, the circumferentially laminated segments 28 each include a plurality of circumferentially side-by-side layers, which are laminated together one after another in the circumferential direction. In other words, each individual segment 28 and each individual segment 30 is formed of a plurality of circumferential laminations, as illustrated by the exploded segments 28. The circumferentially laminated segments 30 have a similar configuration. In addition, the geometry of the illustrated segments 28 and 30 has a substantially triangular or wedge-shaped structure as illustrated by the exploded segments 28. More specifically, the illustrated segments 28 have a wedge-shaped or triangular portion 34 and an outer lip portion 36. The wedge-shaped or triangular portion 34 is disposed lengthwise along the outer circumference or surface 32 of the first plurality of axially laminated segments 18, while the outer lip portion 36 extends partially over an end face 38 of the segments 18. The illustrated second plurality of circumferentially laminated segments 30 have a similar wedge-shaped or triangular portion 34 and outer lip portion 36, which extend along an outer circumference or surface 32 and over an end face 38 of the second plurality of axially laminated segments 20.

In the illustrated embodiment, the one or more radially laminated sections 16 include a single plurality of radially laminated segments 40 in an axial position between the first and second plurality of axially laminated segments 18 and 20 and between the first and second plurality of circumferentially laminated segments 28 and 30. The plurality of radially laminated segments 40 may include a plurality of cylindrical or tubular shaped structures disposed concentrically one after another in a radial direction relative to the axis 26. However, certain embodiments of the radially laminated section 16 include a single continuous strip of material wound successively about the axis 26 to form a plurality of concentric tubular layers corresponding to the plurality of radially laminated segments 40.

The three-dimensionally laminated stator 10 may include a variety of conductive/magnetic materials, lamination adhesives, electrical insulation coatings, and so forth. For example, the axially laminated segments 18 and 20 may include a variety of materials, such as silicon iron, cobalt iron, nickel iron, amorphous iron, aluminum iron alloys. Similarly, the circumferentially laminated segments 28 and 30 may include a variety of materials, such as silicon iron, cobalt iron, nickel iron, amorphous iron, aluminum iron alloys. Finally, the radially laminated segments 40 may include a variety of materials, such as silicon iron, cobalt iron, nickel iron, amorphous iron, aluminum iron alloys. In certain embodiments, the various segments all may include identical materials, or alternating types of materials, or another suitable configuration.

The various segments of the three-dimensionally laminated stator 10 may be coupled or adhered together via one or more layers of bonding materials and electrically insulating materials, such as an epoxy layer and an oxide layer, or by mechanical means such as clamps, keys, etc. For example, the one or more axially laminated sections 12 may include epoxy or another bonding material between each of the first and second plurality of axially laminated segments 18 and 20. In addition, the one or more axially laminated sections 12 may include an oxide coating or another electrically insulating material between each segment of the first and second plurality of axially laminated segments 18 and 20. Similarly, the one or more circumferentially laminated sections 14 may include epoxy and an oxide coating between the respective segments of the first and second plurality of circumferentially laminated segments 28 and 30. The radially laminated section 16 also may include epoxy and an oxide coating between the respective segments of the plurality of radially laminated segments 40. Again, each of the adjacent segments of the axially laminated section 12, the circumferentially laminated section 14, and the radially laminated section 16 may include one or more bonding materials and/or insulating materials to create the three-dimensionally laminated stator. For example, the bonding materials may include high thermal conductivity epoxies. As discussed in further detail below, the axially laminated section 12, circumferentially laminated section 14, and radially laminated section 16 of the three-dimensionally laminated stator 10 substantially increase the flux carrying capability and substantially decrease the eddy current losses in the stator 10.

Figure 2:
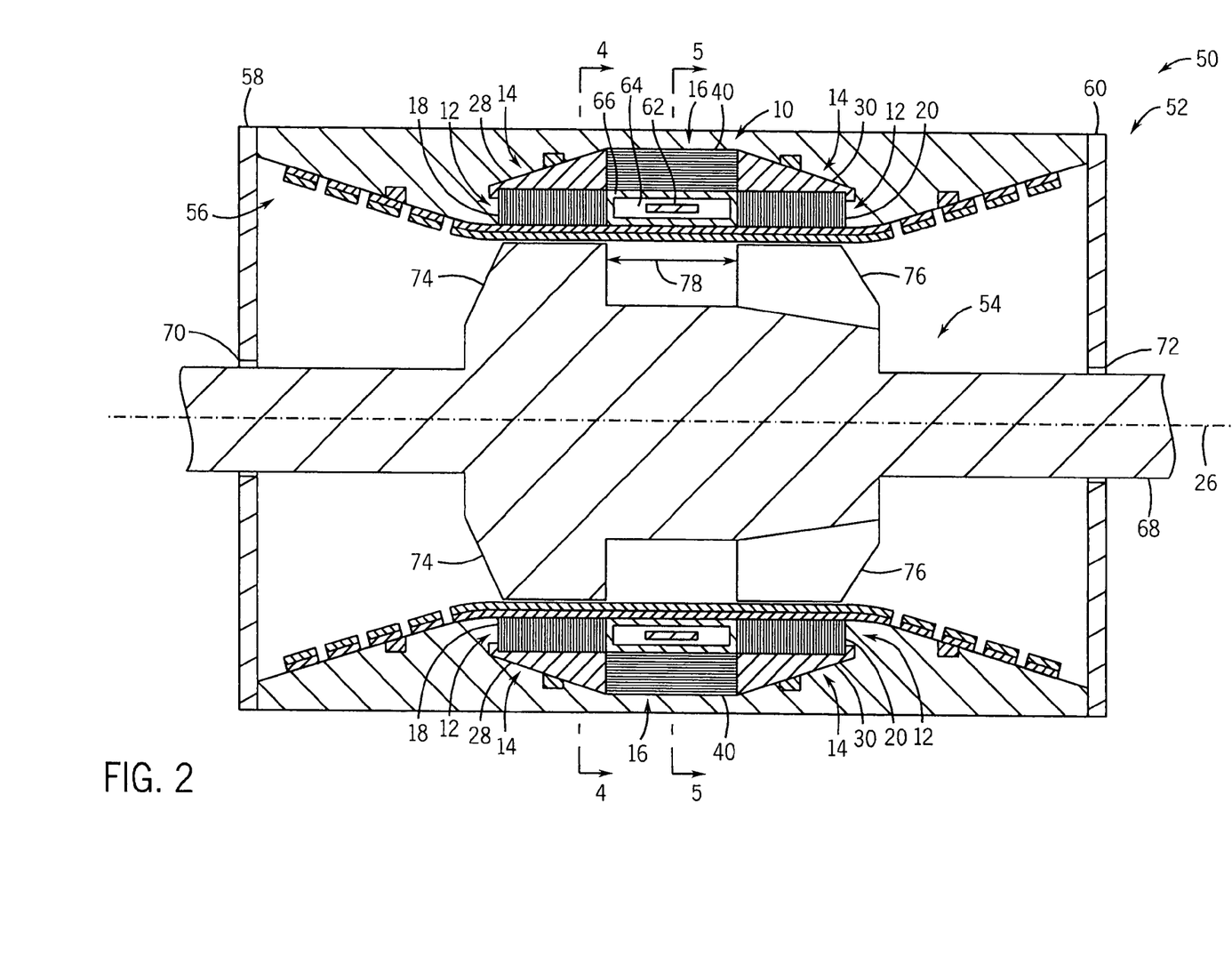
FIG. 2 is a cross-sectional side view of an exemplary electromechanical device having the three-dimensionally laminated stator as illustrated in FIG. 1 in accordance with certain embodiments of the present technique.

FIG. 2 is a cross-sectional side view of an exemplary electromechanical device 50 including the three-dimensionally laminated stator 10 as illustrated in FIG. 1 in accordance with certain embodiments of the present technique. In the illustrated embodiment, the three-dimensionally laminated stator 10 is recessed or generally mounted along an interior of a casing or enclosure 52, which further includes a rotor 54 disposed lengthwise along the axis 26. The three-dimensionally laminated stator 10 further includes a plurality of stator windings 56 disposed along the interior of the enclosure 52 between the sections 12, 14, and 16 and the rotor 54. For example, the stator windings 56 may be disposed in generally axial channels extending lengthwise along the interior of the enclosure 52 between opposite ends 58 and 60 of the enclosure 52. In another embodiment, the stator windings may pass through slots in the axially laminated sections 12. The three-dimensionally laminated stator 10 also may include a field coil 62 disposed within a cooling fluid 64 inside a cooling chamber 66, wherein the field coil 62 is disposed in an axial position between the first and second plurality of axially laminated segments 18 and 20 and between the first and second plurality of circumferentially laminated segments 28 and 30. In addition, the field coil 62 and the cooling chamber 66 are disposed concentrically within the radially laminated section 16. In certain embodiments, the field coil 62 may be a high temperature superconductor (HTS) coil, while the cooling chamber 66 includes a continuous supply of a cryogenic fluid 64, such as neon or nitrogen. The field coil 62 may have a generally cylindrical or tubular geometry, while the cooling chamber 66 may have a generally hollow annular geometry.

As further illustrated in FIG. 2, the rotor 54 includes a shaft 68 rotatably coupled to the casing or enclosure 52 at the opposite ends 58 and 60. Specifically, the illustrated shaft 68 extends through and is rotatably sealed within openings 70 and 72 in the opposite ends 58 and 60, respectively. In addition, the illustrated shaft 68 includes a first set of pole members 74 and a second set of pole members 76, wherein the first and second sets of pole members 74 and 76 are axially offset from one another by an air gap 78. As discussed in further detail below, the first and second sets of pole members 74 and 76 also may be circumferentially offset with one another by a suitable angular pitch, such as approximately one pole pitch. In the illustrated embodiment, the first set of pole members 74 is disposed concentrically within the first plurality of axially laminated segments 18 and the first plurality of circumferentially laminated segments 28, while the second set of pole members 76 is disposed concentrically within the second plurality of axially laminated segments 20 and the second plurality of circumferentially laminated segments 30. In addition, the air gap 78 is disposed concentrically within the plurality of radially laminated segments 40 and the field coil 26 disposed within the cooling chamber 66.

The first and second sets of pole members 74 and 76 may include any suitable numbers, configurations, or geometries of conductive/magnetic members that protrude radially outward from the shaft 68 toward the stator windings 56 and the first segments 18 and 28 and the second segments 20 and 30, respectively. In the illustrated embodiment, the first and second sets of pole members 74 and 76 each include four pole members disposed symmetrically about the shaft 68, wherein the second set of pole members 76 is offset by the extent of one pole member with respect to the first set of pole members 74. For example, the four pole members of the first set 74 may be disposed around the shaft 68 at 0 degrees, 90 degrees, 180 degrees, and 270 degrees, while the four pole members of the second set 76 may be disposed about the shaft 68 at 45 degrees, 135 degrees, 225 degrees, and 315 degrees. In this manner, the circumferential offset between the first and second sets of pole members 74 and 76 substantially reduces or eliminates opposing currents in the stator windings 56 as the rotor 54 rotates within the electromechanical device 50. In the illustrated embodiment, the rotor 54 may be a solid magnetic structure, wherein each of the pole members in the first set 74 has the same magnetic polarity and each of the pole members in the second set 76 has the same magnetic polarity opposite from the first set 74. For example, all of the first set of pole members 74 may correspond to a first plurality, e.g., north, while all of the second set of pole members 76 may correspond to a different second plurality, e.g., south.

In certain embodiment, the illustrated electromechanical device 50 of FIG. 2 may be a motor or a generator, such as a high temperature superconductor (HTS) homopolar inductor alternator (HIA) generator. Moreover, some embodiments of the electromechanical device 50 may include a generator or motor disposed in a power system, a vehicle, an industrial plant, or another suitable application. For example, the electromechanical device 50 may be disposed in an automobile, a locomotive, an aircraft, a watercraft, a bus, or another suitable vehicle. By further example, the illustrated electromechanical device 50 or simply the three-dimensionally laminated stator 10 may be incorporated into synchronous condensers, flywheels, frequency converters etc.

Figure 3:
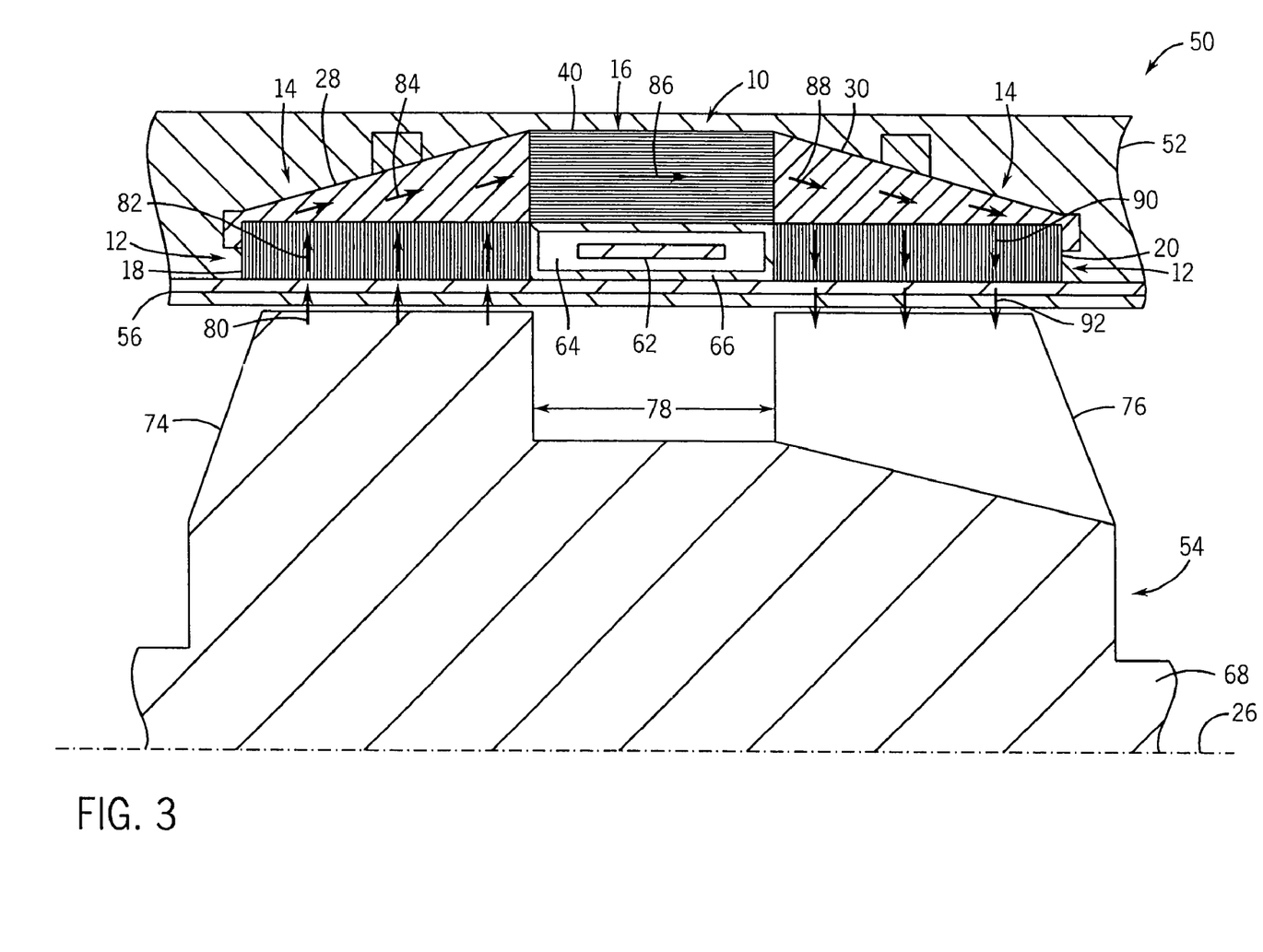
FIG. 3 is a partial cross-sectional side view of the electromechanical device as illustrated in FIG. 2.

For example, if the electromechanical device 50 operates as a generator, then the field coil 62 (e.g., high temperature superconductor coil) may generate a magnetic field surrounding the field coil 62 upon being supplied with an electrical current. The interaction of the magnetic field generated by the field coil 62 with the different magnetic polarities of the first set of pole members 74 and the second set of pole members 76 produces a rotating magnetic field as the rotor 54 rotates about the shaft 68 along the axis 26. The magnetic lines of flux from the first and second set of pole members 74 and 76 pass through the stator windings 56 and the three-dimensionally laminated stator 10, as illustrated in FIG. 3. The illustrated three-dimensionally laminated stator 10 may be described as a five section laminated structure having a combination of all three planer flux paths possible in cylindrical coordinates. These three planer flux paths include radial-peripheral, radial-axial, and peripheral-axial. As the excitation flux travels through the rotor 54 into the stator 10 across the air gap 78 and armature or stator winding 56, the flux encounters a radial-peripheral path that may be shared with the armature reaction flux. The lamination depth beyond the armature or stator winding 56 may be designed such that it can carry substantially the full armature reaction flux within the saturation limit of the material along with the excitation flux.

As illustrated in FIG. 3, the magnetic flux passes from the first set of pole members 74 of the rotor 54 into the stator windings 56 and through the first plurality of axially laminated segments 18 as indicated by arrows 80 and 82. The flux passes through the axially laminated segments 18 along a radial-peripheral path, e.g., arrows 82. Radially outward from the first plurality of axially laminated segments 18, the magnetic flux passes through the first plurality of circumferentially laminated segments 28 as indicated by arrows 84. The circumferentially laminated section 14 having the first plurality of circumferentially laminated segments 28 provides relatively high reluctance to magnetic flux in the peripheral or circumferential directions, thereby substantially forcing or focusing the path of the magnetic flux in the radial and axial direction (i.e., a radial-axial path) toward the radially laminated section 16.

The plurality of radially laminated segments 40 in the radially laminated section 16 is configured to carry or focus the magnetic flux in the peripheral-axial plane. For example, the radially laminated section 16 may receive the magnetic flux axially over a pole from one side (e.g., first set of pole members 74), and then divide the magnetic flux into two halves peripherally and transmit the magnetic flux to two halves of the opposite poles on the other side (e.g., second set of pole members 76). The peripheral-axial path of the magnetic flux through the radially laminated section 16 is illustrated in FIG. 3 by arrow 86, and is described in further detail below with reference to FIG. 6.

The magnetic flux then passes through the second plurality of circumferentially laminated segments 30 of the circumferentially laminated section 14 along an axial-radial path, as indicated by arrows 88. In turn, the magnetic flux passes through the second plurality of axially laminated segments 20 of the axially laminated section 12 along a peripheral-radial path as indicated by arrows 90. Finally, the magnetic flux returns to the rotor 54 through the stator windings 56 into the second set of pole members 76 as indicated by arrows 92. The magnetic circuit is completed through the rotor 54 between the first and second sets of pole members 74 and 76, wherein the rotor 54 carries the magnetic flux in the axial direction along the axis 26.

As discussed above, the three-dimensionally laminated stator 10 facilitates five different paths of the magnetic flux, including the radial-peripheral path, the radial-axial path, the peripheral-axial path, the axial-radial path, and the peripheral-radial path through the segments 18, segments 28, segments 40, segments 30, and segments 20, respectively. In this manner, the three-dimensionally laminated stator 10 substantially improves the flux carrying capacity and minimizes any eddy losses through the electromechanical device 50.)

Figure 4:
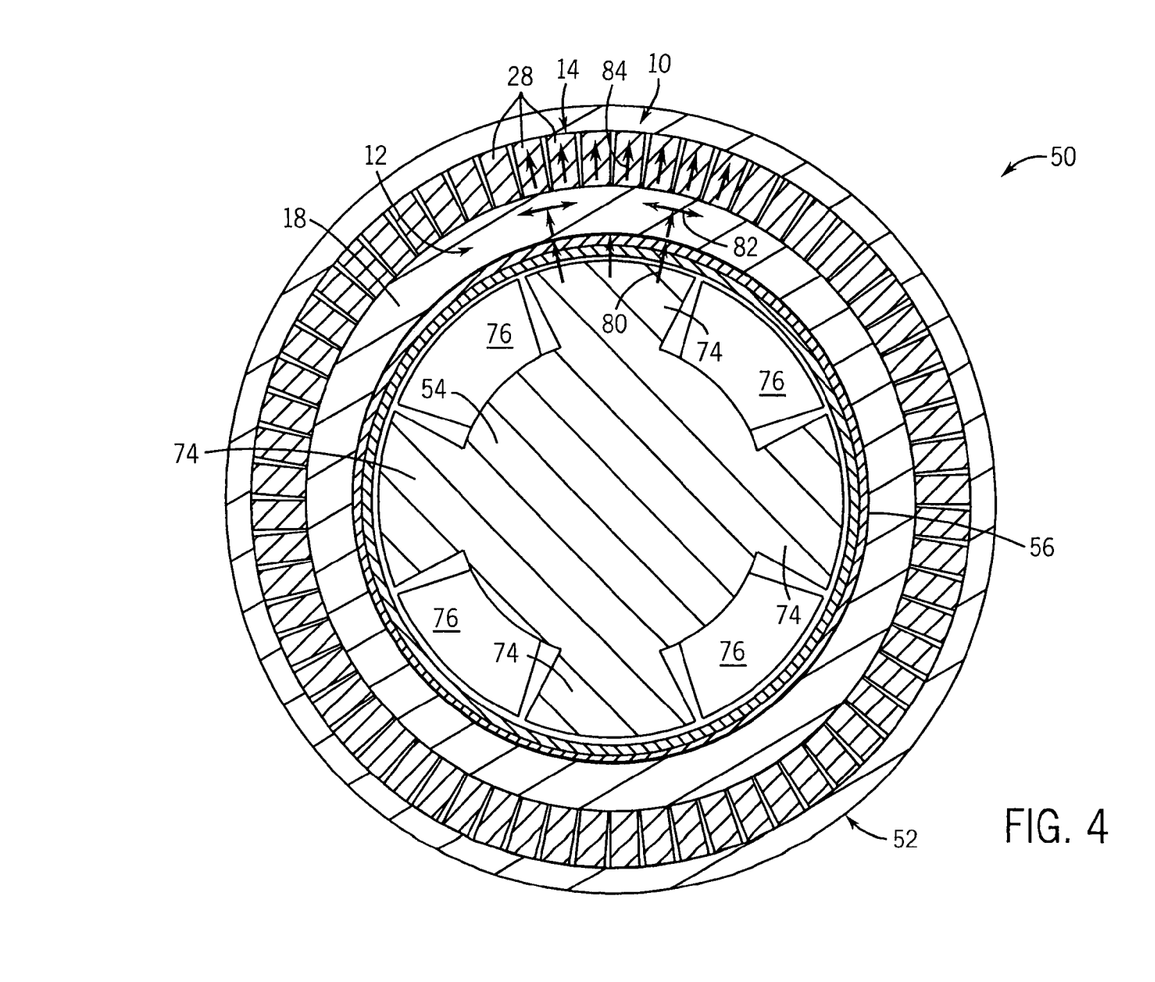
FIG. 4 is a cross-sectional end view of the electromechanical device as illustrated in FIG. 2, further illustrating laminated segments of the axially laminated section and the circumferential laminated section in accordance with certain embodiments of the present technique.

FIG. 4 is a cross-sectional end view of the electromechanical device 50 illustrated in FIGS. 2 and 3, further illustrating the magnetic flux paths through the first plurality of axially laminated segments 18 and the first plurality of circumferentially laminated segments 28 of the three-dimensionally laminated stator 10 in accordance with certain embodiments of the present technique. As illustrated, the magnetic flux passes in a radial-peripheral path 82 through the first plurality of axially laminated segments 18, followed by a radial-axial path 84 through the first plurality of circumferentially laminated segments 28. Again, the bonding materials and/or electrically insulating materials between the adjacent segments substantially increase the reluctance to magnetically flux across the adjacent segments. For example, the first plurality of circumferentially laminated segments 28 have a relatively high reluctance to magnetically flux in the peripheral or circumferential direction, while facilitating passage of the magnetic flux in the radial and axial directions toward the central radially laminated sections 16.

Figure 5:
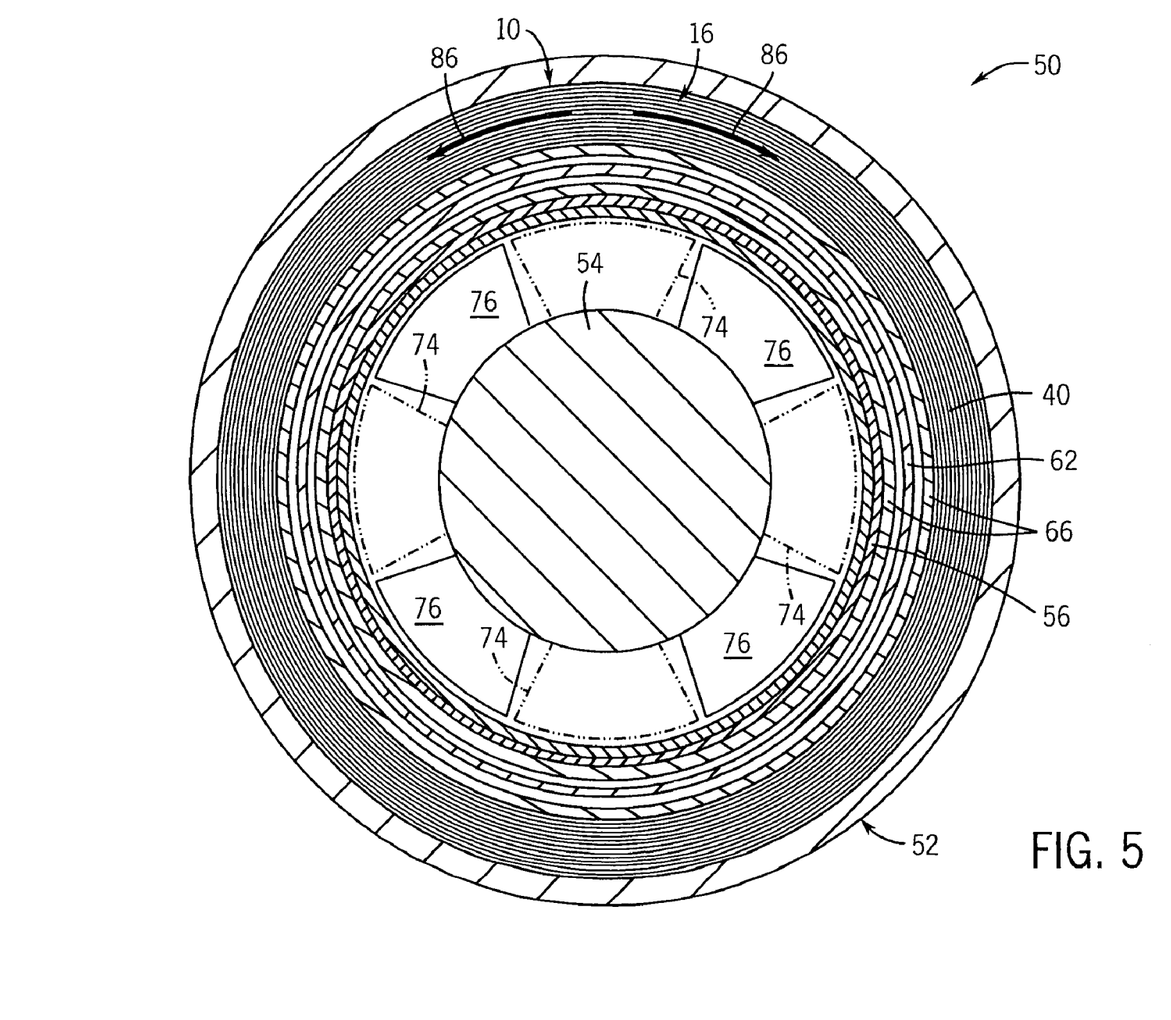
FIG. 5 is a cross-sectional end view of the center section of the electromechanical device as illustrated in FIG. 2, further illustrating laminated segments of the radially laminated section in accordance with certain embodiments of the present technique.

After passing through the first plurality of circumferentially laminated segments 28, the magnetic flux passes through the plurality of radially laminated segments 40 of the radially laminated section 16 in the peripheral-axial path 86 as further illustrated with reference to FIG. 5. As illustrated and mentioned above, the magnetic flux corresponding to one of the first set of pole members 74 and 76 splits into two opposite peripheral or circumferential directions 86 through the plurality of radially laminated segments 40, thereby directing the magnetic flux to a pair of adjacent pole members of the second set 76. The magnetic flux subsequently passes through the second set of circumferentially laminated segments 30 and the second set of axially laminated segments 20 as discussed in detail above.

Figure 6:
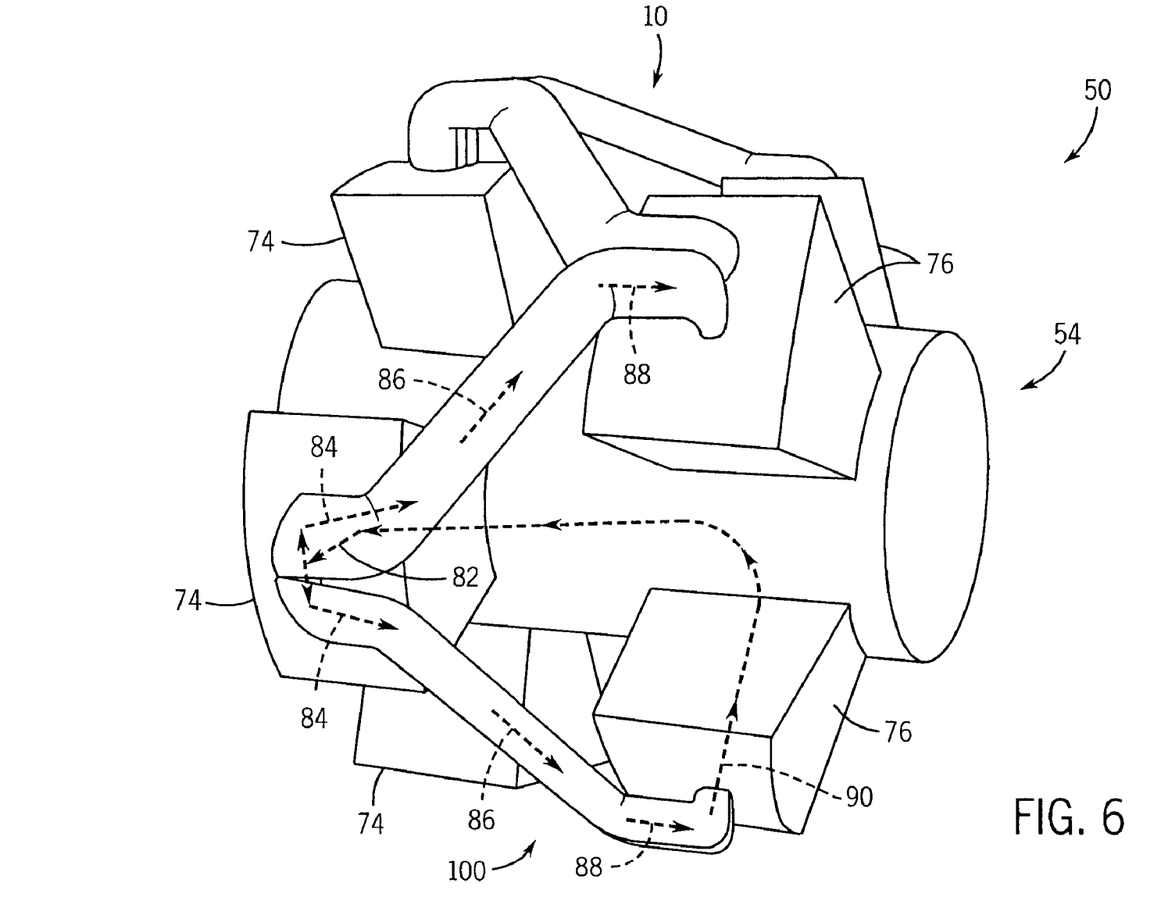
FIG. 6 is a perspective diagrammatical view of an exemplary three-dimensional flux path through the three-dimensionally laminated stator as illustrated in FIGS. 1 and 2 in accordance with certain embodiments of the present technique.

FIG. 6 is a diagrammatical perspective view of an exemplary three-dimensional flux path 100 that may be achieved by the three-dimensionally laminated stator 10 as discussed in detail above with reference to FIGS. 1-5. As illustrated in FIG. 6, the three-dimensional flux path 100 from the first set of pole members 74 to the second set of pole members 76 includes the radial-peripheral path 82, the radial-axial paths 84, the peripheral-axial paths 86, the axial-radial paths 88, and the peripheral-radial paths 90 as discussed in detail above. Although the three-dimensional flux path 100 is illustrated without the corresponding three-dimensionally laminated stator 10, the paths 82, 84, 86, 88, and 90 correspond to the first plurality of axially laminated segments 18, the first plurality of circumferentially laminated segments 28, the plurality of radially laminated segments 40, the second plurality of circumferentially laminated segments 30, and the second plurality of axially laminated segments 20, respectively. The illustrated three-dimensional flux path 100 advantageously improves the flux carrying capability of the stator 10, thereby minimizing eddy current losses and weight of the stator 10 and the overall electromechanical device 50.

While the invention may be subject to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An electromechanical device, comprising:
a rotor having a rotational axis; and
a stator disposed about the rotor, wherein the stator comprises:
a circumferentially laminated section comprising a plurality of circumferential segments disposed one after another in a circumferential direction relative to the rotational axis;
a radially laminated section comprising a plurality of radial segments disposed one after another in a radial direction relative to the rotational axis; and
an axially laminated section comprising a plurality of axial segments disposed one after another in an axial direction relative to the rotational axis.

2. The electromechanical device of claim 1, wherein each of the plurality of circumferential segments has a substantially triangular cross-section.

3. The electromechanical device of claim 1, wherein each of the plurality of radial segments has a substantially tubular geometry.

4. The electromechanical device of claim 1, wherein each of the plurality of axial segments has a substantially ring-shaped geometry.

5. The electromechanical device of claim 1, wherein the circumferentially laminated section and the axially laminated section are concentric with one another.

6. The electromechanical device of claim 1, wherein the circumferentially laminated section and the radially laminated section are axially adjacent one another.

7. The electromechanical device of claim 1, wherein the plurality of circumferential segments comprises first and second sets of circumferential segments, each of the first and second sets of circumferential segments having the circumferential segments disposed one after another around the rotor, and the first and second sets of circumferential segments are disposed on axially opposite sides of the radially laminated section.

8. The electromechanical device of claim 7, wherein the plurality of axial segments comprises a first set of axial segments substantially concentric with the first set of circumferential segments, and a second set of axial segments substantially concentric with the second set of circumferential segments.

9. The electromechanical device of claim 8, wherein rotor comprises a first set of pole members substantially concentric with the first set of circumferential segments and the first set of axial segments, and a second set of pole members substantially concentric with the second set of circumferential segments and the second set of axial segments.

10. The electromechanical device of claim 9, comprising a superconducting field coil substantially concentric with the radially laminated section.

11. The electromechanical device of claim 1, comprising a generator having the rotor and the stator.

12. The electromechanical device of claim 1, comprising a motor having the rotor and the stator.

13. A system, comprising:
an electromechanical device, comprising:
    a rotor having a rotational axis; and
    a stator disposed about the rotor, wherein the stator comprises:
        a radially laminated section;
        first and second axially laminated sections disposed on axially opposite sides of the radially laminated section; and
        first and second circumferentially laminated sections disposed concentrically over and around the first and second axially laminated sections, respectively.

14. The system of claim 13, wherein the rotor comprises a first set of pole members axially offset from a second set of pole members, wherein the first and second sets are disposed on the opposite sides of the radially laminated section.

15. The system of claim 14, wherein the first set of pole members is circumferentially offset from the second set of pole members.

16. The system of claim 13, wherein the electromechanical device comprises a high temperature superconductor coil disposed between the radially laminated section and the rotor.

17. The system of claim 13, wherein the electromechanical device comprises a homopolar inductor alternator.

18. The system of claim 13, comprising a transportation vehicle having the electromechanical device.

19. The system of claim 13, comprising a power system having the electromechanical device.

20. A method, comprising:
radially-peripherally directing magnetic flux from a rotor into a stator along a radial-peripheral path through a first plurality of axially laminated stator segments of the stator;
radially-axially directing the magnetic flux from the first plurality of axially laminated stator segments along a radial-axial path through a first plurality of circumferentially laminated stator segments of the stator; and
peripherally-axially directing the magnetic flux from the first plurality of circumferentially laminated stator segments along a peripheral-axial path through a plurality of radially laminated stator segments of the stator.

21. The method of claim 20, comprising:
axially-radially directing the magnetic flux from the plurality of radially laminated stator segments along an axial-radial path through a second plurality of circumferentially laminated stator segments of the stator; and
peripherally-radially directing the magnetic flux from the second plurality of circumferentially laminated stator segments along a peripheral-radial path through a second plurality plurality of axially laminated stator segments of the stator.

22. The method of claim 21, comprising directing the magnetic flux along the rotor between a first set of pole members and a second set of pole members, wherein the second set of pole members is axially offset from the first set of pole members, the first set of pole members is substantially concentric with the first plurality of axially laminated stator segments and the first plurality of circumferentially laminated stator segments, and the second set of pole members is substantially concentric with the second plurality of axially laminated stator segments and the second plurality of circumferentially laminated stator segments.

* * * * *